United States Patent [19]

Matsutani

[11] Patent Number: 4,745,714
[45] Date of Patent: May 24, 1988

[54] ARTICULAR POLE ASSEMBLY CAPABLE OF WINDING

[76] Inventor: Keinosuke Matsutani, 14-7, Katori 2-Chome, Ichikawa-shi, Chiba, 272-01, Japan

[21] Appl. No.: 21,069

[22] Filed: Mar. 3, 1987

[30] Foreign Application Priority Data

Apr. 3, 1986 [JP] Japan ................................. 61-75412

[51] Int. Cl.⁴ .......................................... E04H 12/18
[52] U.S. Cl. .................................... 52/108; 242/54 R
[58] Field of Search ............... 52/108, 696; 242/54 R; 49/325

[56] References Cited

U.S. PATENT DOCUMENTS

| 1,804,134 | 5/1931 | Unger | 52/108 |
| 2,419,321 | 4/1947 | Lopes | 52/108 |
| 2,481,471 | 9/1949 | Crot | 52/108 |
| 4,406,096 | 9/1983 | Matsutani | 52/108 |

FOREIGN PATENT DOCUMENTS 1069880  5/1967  United Kingdom ................. 52/108

Primary Examiner—David A. Scherbel
Assistant Examiner—Caroline D. Dennison
Attorney, Agent, or Firm—Armstrong, Nikaido, Marmelstein & Kubovcik

[57] ABSTRACT

There is disclosed a novel articular pole assembly, comprising: an articular pole which is composed of a continuous series of unit block members connected to one another by pins, the unit members each having a main body formed by bending a relatively tough and hard plate material in such a manner that the main body has a channel-like cross-section, each block member also having a connecting plate pivotally supported by the main body at open terminal portions of the main body, the main body having stepped areas where projected parts are present, so that the projected parts of one block member can be releasably engaged with corresponding recess parts of the main body of the adjacent block member, the main body being provided with notches which can be releasably engaged with the connecting plate, the main body having a teeth portion which can be releasably engaged with a sprocket for driving the articular pole; and a take-up reel for storing the articular pole in a wound or curved state thereon.

8 Claims, 5 Drawing Sheets

FIG. 5
FIG. 6
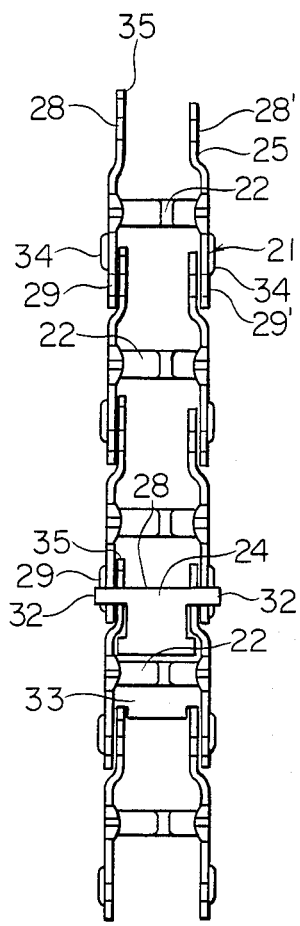
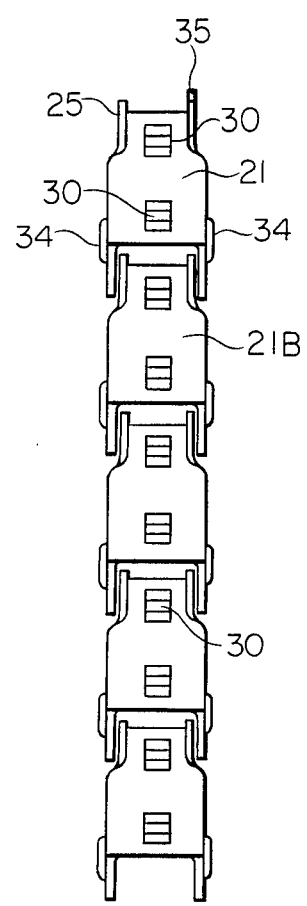

ARTICULAR POLE ASSEMBLY CAPABLE OF WINDING

BACKGROUND OF THE INVENTION

The present invention relates to an articular pole assembly capable of winding.

My earlier U.S. Pat. No. 4,406,096 discloses an articular pole assembly capable of winding, comprising an articular pole and a take-up casing for storing the pole, the articular pole being composed of a continuous series of unit block members connected to one another by pins and by projection-notch engagements, with the proviso that, when the pole is pushed into the casing, the projection-notch engagements are released with disengaging means so as to make the pole rotatable about the pins, whereby the continuous series of unit block members can be stored in a wound or curved state in the casing. The unit block members each, disclosed in said U.S. Patent, has a pair of independent side plates and a connecting plate, the side plates of one unit block member being connected to the corresponding side plates of the adjacent unit block member by pins, the connecting plate having projections releasably engaged with notches of the side plates of the adjacent unit block member, with the proviso that the spring is employed to urge the projections of the connecting plate to push towards the notches of the side plates.

However, the known articular pole assembly mentioned above has somewhat insufficient strength, and therefore it is rather unsuitable for some industrial fields wherein a very strong and rigid pole structure having a high load suporting capacity are required. This is because the unit block members each of the known pole is composed of the three independent parts i.e. two side plates and one connecting plate. Furthermore, the fabrication of the known pole is difficult.

SUMMARY OF THE INVENTION

It is an object of the invention to provide an improved pole assembly which can be extended to a desired length to form a very strong and rigid pole when it is used, and which can be stored in a wound or bent state on a take-up reel. This pole assembly can be used, for instance, in a rear mirror of a car, a desk stand, a fire engine, a rescue-ship, a TV-camera car, an emergency bridge, etc.

It is another object of the invention to provide an articular pole assembly which can be easily fabricated without any technological difficulty.

It is still another object of the invention to provide an articular pole assembly which can be easily extended, wound and transferred to a place where it is used or stored.

It is a further object of the invention to provide an articular pole assembly which when it is extended, provides a satisfactorily strong and rigid pole structure having a form of a straight line or an arch line inclined leftwards or rightwards.

It is still another object of the invention to provide an articular pole assembly which can be easily fabricated in a desired size and which can be employed in various industrial fields where an extensible pole with a sufficient structural strength is required.

It is still another object of the invention to provide an articular pole assembly which has a simple and strong structure and which can be smoothly extended, wound and transferred.

Accordingly, the invention relates to an articular pole assembly, comprising:

an articular pole which is composed of a continuous series of unit block members connected to one another by pins, the unit members each having a main body formed by bending a relatively tough and hard plate material in such a manner that the main body has a channel-like cross-section, each block member also having a connecting plate pivotally supported by the main body at open terminal portions of the main body, the main body having stepped areas where projected parts are present, so that the projected parts of one block member can be releasably engaged with corresponding recess parts of the main body of the adjacent block member, the main body being provided with notches which can be releasably engaged with the connecting plate, the main body having a toothed portion which can be releasably engaged with a sprocket for driving the articular pole; and a take-up reel for storing the articular pole in a wound or curved state thereon.

An important feature of the invention is that each unit block member essentially comprises the following two parts i.e. (i) a main body with a channel-like cross-section, and (ii) a connecting plate which is kept under a resilient action by a spring. Another important feature is that one block member is partially superposed on the adjacent block member in a manner that the articular pole according to the invention has a sufficient structural strength when it is in an extended state. In addition, the invention provides a cylindrical take-up reel with successive helical ridges and grooves on which the articular pole can be stored in a curved state. The cylindrical reel is very suitable especially for storing a long articular pole consisting of a great number of unit block members connected to one another.

The foregoing and other characteristics of the invention will become clearer from the following descriptions of preferred embodiments thereof given by way of examples and not in a limiting sense, and depicted in the annexed drawings.

BRIEF DESCRIPTION OF THE DRAWINGS

FIG. 5 is a front view of the unit block members shown in FIG. 4.

FIG. 6 is a rear view of the unit block members shown in FIG. 4.

DESCRIPTION OF THE PREFERRED EMBODIMENTS

Figure 1:
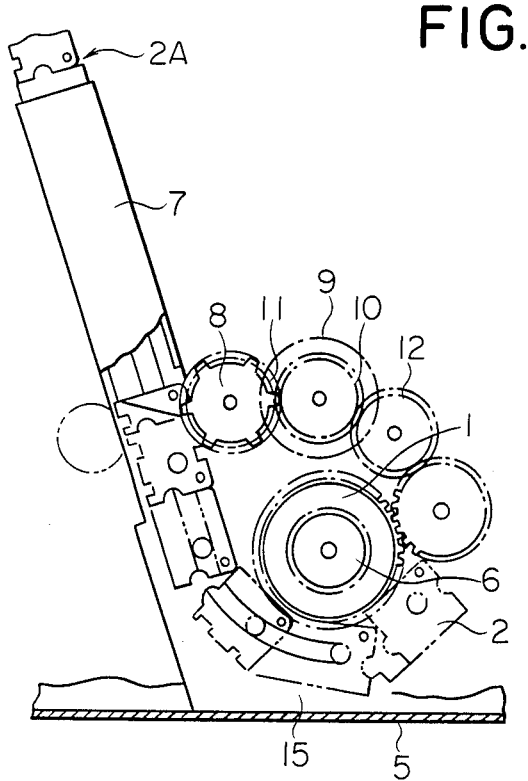
FIG. 1 is a side view of an articular pole assembly capable of winding, according to the invention.
Figure 2:
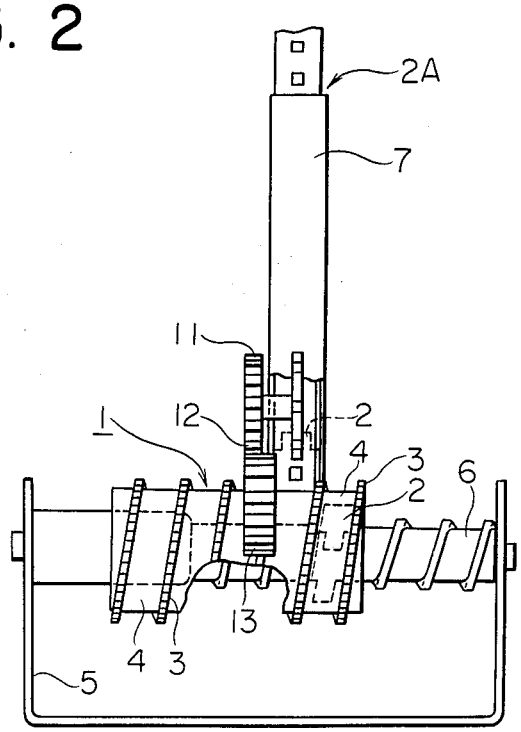
FIG. 2 is a front view of the pole assembly shown in FIG.1.
Figure 3:
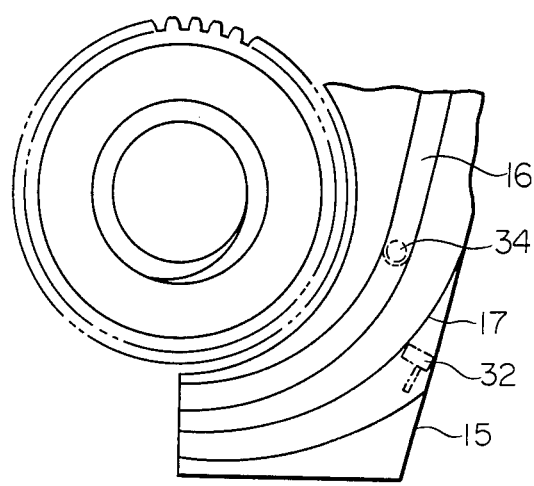
FIG. 3 is an enlarged side view of a portion of the pole assembly shown in FIG. 1.
Figure 4:
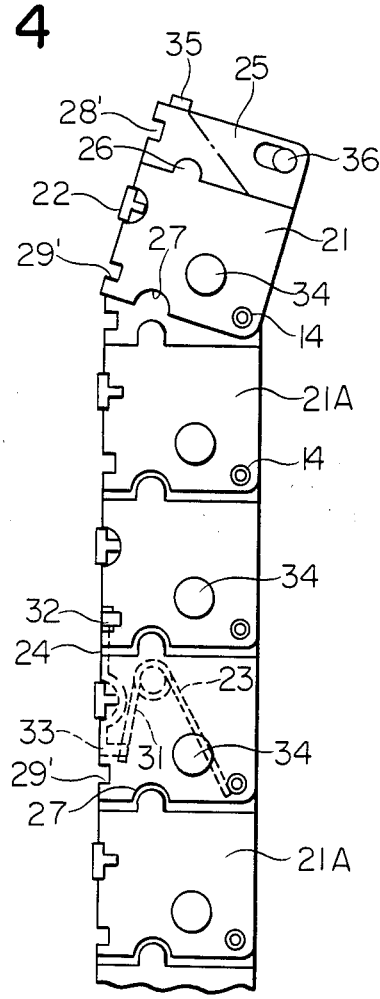
FIG. 4 is a side view of a portion of a continuous series of the unit block members employed in the pole assembly shown in FIG. 1.

In FIGS. 1 and 2, the reference numeral 2A denotes an articular pole capable of winding. The reference numeral 1 denotes a take-up reel for storing the pole 2A in a wound or curved state.

The articular pole 2A is formed by connecting a plurality of unit block members 2 to one another in series. As shown in FIGS.4 to 7, each unit block member 2 has a main body 21 with a channel-like cross-section. The main body 21 can be formed by bending a relatively strong and tough plate material made, for instance, from a metal or a synthetic resin. The thickness of the plate material may, for example, be about 2 mm. By the term "channel-like cross-section", it is meant that said cross-section has a shape similar to that of the cross-section of a channel formed from steel.

As explained above, the main body 21 of the unit block member 2 has a channel-like cross-section.

Thus, the main body 21 consists of a pair fo side walls 21A and one bottom portion 21B. A connecting plate 24 is disposed in a space between the side walls 21A of the main body 21 in a direction perpendicular to that of the side walls 21A of the main body 21. An arch portion 31 of the connecting plate 24 is pivotally supported by the main body 21 at a projection 22 of the main body 21 which extends from one side wall 21A and connects with a second projection 22A extending from the opposite side wall.

Each unit block member 2 is rotatably connected to the adjacent or next block member by a pin 14, which is inserted into the main body 21. The side walls 21A of the main body 21 have two pairs of notches 28, 28' and 29, 29', which are releasably engaged with the front projections 32 of the connecting plate 24 in the manner shown hereinbelow. A spring 23 is disposed in the main body 21 in such a way that one end of the spring 23 is against the pin 14 and the other end is allowed to contact and resiliently push the rear end portion 33 of the connecting plate 24. In order to connect the connecting plate 24 of one unit block member 2 to the corresponding main body 21 of the adjacent block member 2, the following operation can be conducted : stepped portions 25 are formed on the front portion of the main body 21, so that the stepped portions 25 of one block member 2 can be positioned inside the rear parts of the adjacent block member, and the resulting plate-superposition areas are pivotally connected together by the pin 14. Furthermore, the stepped portions 25 of one unit block member 2 have semicircular projections 26 which can be releasably engaged with corresponding semicircular recesses 27 of the adjacent block member.

Figure 7:
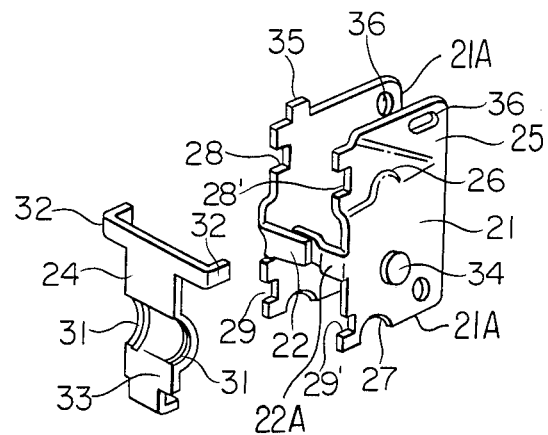
FIG. 7 is a fragmentary perspective view of one unit block member.
Figure 8:
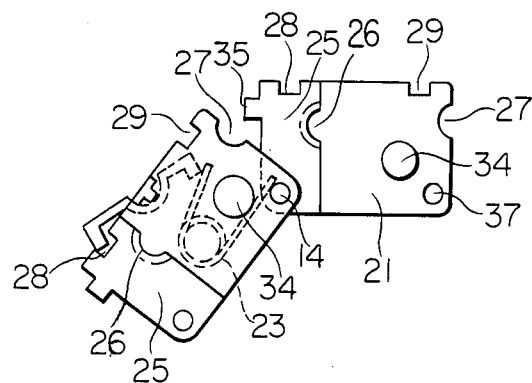
FIG. 8 is a side view of two unit block members connected to each other.

The stepped portions 25 each have a hole 36 for the pin 14. This hole 36 has a shape of an elongated circle as shown in FIG. 7. On the other hand, the hole 37 in the main body 21 for the pin 14 has a shape of an ordinary circle. By forming the holes for the pins 14 in the manner shown above, it is possible to smoothly wind the articular pole 2A on the helical grooves 3 of the take-up reel 1 without any undesired disconnections or breaks of the unit block members 2, even if the pole 2A is twisted to a certain extent during the winding operation.

As shown in FIGS. 1 and 2, the take-up reel 1 has a cylindrical shape and is provided with a screw shaft 6 kept on a support 5, so that the reel 1 can be rotatably moved along the main axis of the shaft 6. The cylindrical surface of the reel 1 has successive helical grooves 4 and ridges 3, so that the articular pole 2 can be received in the wound state on the grooves 4 of the reel 1. A guide tube 7 is disposed adjacent the take-up reel 1, so that the articular pole 2A can be passed through the guide tube 7 when the pole 2A is extended from or stored on the reel 1. The guide tube 7 has a guide plates 15 provided with a guide grooves 16 for receiving the projections 34 of the main body 21 of the unit block member 2. The guide plates 15 have curved rails or edges 17 for receiving the front projections 32 of the connecting plate 24.

At the curved portion of the guide tube 7, the curved edges 17 have a cam action of disengaging the projections 32 of the connecting plate 24 from the superposed notch portions, consisting of the notches 29 of one unit block member 2 and the notches 28 fo the adjacent block member, when these unit block members 2 are passed through the curved edges 17 towards the take-up reel 1.

If the size of the articular pole 2A is relatively small, it can be operated by hand. If the size of the pole 2A is large, it can be moved by a motor 9 via transmission means involving, for instance, gears 10 and 11 and a sprocket 8 is rotatably engaged with the teeth portion 30 of the main body 21 of each block member 2 for driving the pole 2A.

The transmission means also have gears 12 and 13, so that the motor 9 can drive the take-up reel 1 via a series of gears i.e. the gears 10, 12 and 13 and the teeth portions of the ridges 3 of the reel 1. According to this transmission mechanism, the take-up reel 1 is rotatably moved along the main axis of the shaft 6 in such a way that the position of the reel 1 is adjusted to the position of the guide tube 7 so as to smoothly move the articular pole 2A through the guide tube 7 when the pole 2A is wound on or extended from the reel 1.

When the articular pole 2A, consisting of the continuous series of the unit block members 2, is moved towards the take-up reel 1, and each block member 2 is passes through the curved edges 17 of the guide plate 15, then the front projections 32 of the connecting plate 24 of the unit block member 2 are deviated away from the main body 21 due to the cam action of the curved edges 17 of the guide plate 15, so that the connecting plate 24 is moved around the projections 22A of the main body 21, whereby the projections 32 of the connecting plate 24 are disengaged from the superposed notch portions consisting of the notches 29 of one block member 2 and the notches 28 of the adjacent block member. As a result of this disengagement, each block member 2 is made rotatable about the pin 14, so that the articular pole 2A has no longer a rigidity as a whole at this time, and can be stored in a wound or curved state on the take-up reel 1.

When the articular pole 2A, consisting of the continuous series of the unit block members 2, is pulled out from the take-up reel 1, and each block member 2 is passed through the curved edges 17 of the guide plates 15, towards the outside area, then the bent projections 32 of the connecting plate 24 of one unit block member 2 are pushed into and engaged with the superposed notch portions consisting of the notches 29 of one block member 2 and the notches 28 of the adjacent block member 2, under the resilient action of the spring 33, so that the articular pole 2A is made to form a straight line and to have a rigidity as a whole. So, when the articular pole 2A has been pulled out from the take-up reel 1, it has a rigidity as a whole.

As it is apparent from the above, the connecting plate 24 of each unit block member 2 of the articular pole 2A has such a function that, when the pole 2A is pulled out from the take-up reel 1 and the projections 32 of the connecting plate 24 are slidably engaged with the curved edges 17 of the guide plate 15, then the projections 32 are engaged with the superposed notch portions which consist of the notches 29 of one block member 2 and the notches 28 of the adjacent block member under the resilient action of the spring 23.

If desired, the engagement of the projections 32 of the connecting plate 24 with the notches 28,28', and 29 and 29' of the main body 21 can be promoted wiht a guide roller, which may be disposed near the guide tube 7 for guiding the unit block members 2.

It will be seen from the above that the articular pole assembly 2A is satisfactorily strong and durable. When the articular pole 2A is in the extended state, it has a sufficient load bearing capacity for the following reasons : the continuous series of unti block members 2 are tightly connected to one another by the pins 14 ; the notches 29 of each unit block member 2 are superposed on the notches 28 of the adjacent block member, and the resultant superposed notch portions are engaged with the projections 32 of the connecting plate 24 with the aid of the springs 23 ; and the semicircular projections 26 of the stepped portions 25 of each unit block member 2 are engaged with the corresponding semicircular recesses 27 on the front end of the adjacent block member 2, so that the pole 2A can be surely kept from any undesirable sagging.

In addition, there is a unique feature that each block member 2 has a portion 35 at the front end of one of the stepped portions 25 thereof, so that, when the articular pole 2A is in the extended state, the portion 35 of one block member 2 will contact the rear end portion 33 of the connecting plate 24 disposed in the adjacent block member, end will therefore serve as one of the means for effectively suppressing any undesired swing motion of the pole 2A.

Figure 9:
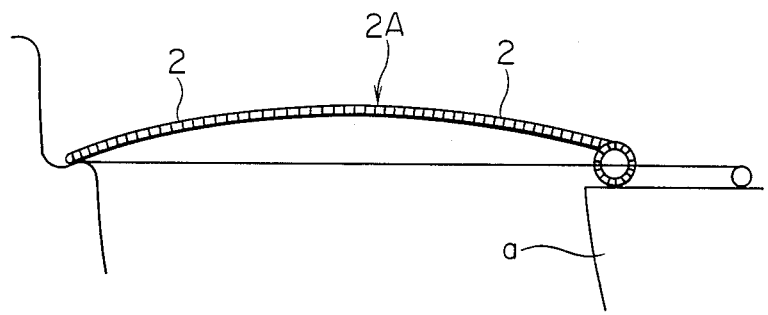
FIG. 9 is a schematic side view of a rescue-ship provided with a bridge employing an articular pole assembly according to the invention.

FIG. 9 shows a rescue-ship (a) provides with an articular pole assembly 2A having a continuous series of unit block members 2 according to the invention.

Figure 10:
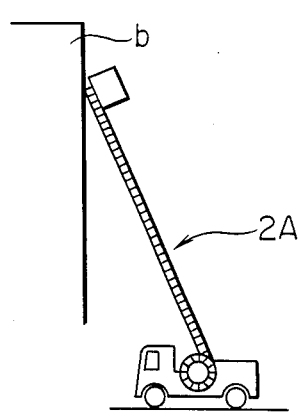
FIG. 10 is a schematic side view of a fire engine provided with an extensible ladder employing an articular pole assembly according to the invention.
Figure 11:
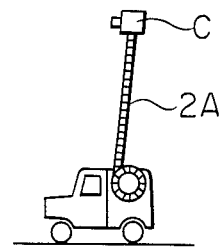
FIG. 11 is a schematic side view of a TV-camera car provided with an articular pole assembly according to the invention.

FIG. 10 illustrates a fire engine provided with an articular pole assembly 2A according to the invention as a ladder. The symbol (b) represents a building, FIG. 11 shows a TV-camera car provided with an articular pole assembly 2A according to the invention for supporting a TV-camera (c).

The particular pole assembly according to the invention has a simple and strong structure and can easily be fabricated by connecting a continuous series of unit block members together. The pole strength can be adjusted at will, and it is, of course, possible to fabricate a very strong pole assembly. The pole can be stored in a wound or curved state on a take-up reel, so that the take-up reel can be placed even in a relatively small space.

I claim:

1. An articular pole assembly comprising an articular pole composed of a single continuous series of unit block members pivotally connected to one another by pins and a take-up reel for extending the articular pole and for retracting and storing the articular pole in a wound state thereon, wherein each unit block member of said articular pole assembly comprises:
   a main body formed of a single piece of hard plate material shaped in such a manner that the main body has a channel-like cross section;
   the main body consisting of a bottom portion and a pair of side walls at opposing sides thereof perpendicular thereto forming a channel shape, said side walls having connecting projections at distal portions extending perpendicular therefrom;
   a connecting plate pivotably supported by said connecting projections at an open terminal portion of said main body, said connecting plate having front projections formed thereon which are releasably engageable with notches provided in the side walls of the block member and an adjacent unit block member;
   said main body being formed with stepped areas in said side walls such that an end of one block member may fit within the channel-like cross section of an adjacent block member main body, the stepped areas having a semi-circular projection part releasably engageable with semi-circular recess end parts of the adjacent block member side walls when the pole is extended; and
   at least one end wall stepped area of said main body being provided with a projection portion extending to contact a rear end portion of an adjacent block member connecting plate when said articular pole is in an extended state so as to suppress undesired swing motion of said pole.

2. An articular pole assembly as defined in claim 1, wherein the take-up reel is provided with a guide tube for guiding the articular pole in such a way that, when the pole is wound on or extended from the take-up reel through the guide tube, the position of the reel is laterally adjusted to the position of the guide tube by means of an adjusting mechanism.

3. An articular pole assembly as defined in claim 1 or 2, wherein the take-up reel has cam portions co-acting with the projections of the connecting plate for disengaging the projections from the notches of the main body against the resilient action of the spring so as to make the unit block members rotatable about the pins, whereby the block members can be stored in a wound or curved state on the reel.

4. An articular pole assembly as defined in any one of claims 1 or 2, wherein the take-up reel has a cylindrical form.

5. An articular pole assembly as recited in claim 1 wherein each unit block member main body has two pairs of notches in the side walls thereof, a first pair of notches in the side walls of one unit block main body being superposed with a second pair of notches in an adjacent connected unit block main body when said pole is in the extended position, and the connecting plate of one main body having bent projections and being movable between an unengaged position and an engaged position wherein the bent projections are engaged with the superposed notches so as to prevent movement between said connected unit block members in the extended position.

6. An articular pole assembly as recited in claim 1 wherein said main body is further provided with a toothed portion thereon that is engageable with a sprocket means for driving said unit block members when extending and retracting said pole.

7. An articular pole assembly as recited in claim 1 or 2 wherein said main body is formed with holes in said side walls into which said connecting pins are fitted, wherein one of said holes is elongated so as to allow said pole to be wound helically on a cylindrical take-up reel.

8. An articular pole assembly as recited in claim 5 wherein the take-up reel includes a motor and transmission member connected to said sprocket means for extending and retracting said pole.

* * * * *